(12) United States Patent
Desoli et al.

(10) Patent No.: US 6,895,460 B2
(45) Date of Patent: May 17, 2005

(54) SYNCHRONIZATION OF ASYNCHRONOUS EMULATED INTERRUPTS

(75) Inventors: Giuseppe Desoli, Watertown, MA (US); Paolo Faraboschi, Brighton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

(21) Appl. No.: 10/198,839

(22) Filed: Jul. 19, 2002

(65) Prior Publication Data

US 2004/0015627 A1 Jan. 22, 2004

(51) Int. Cl.[7] .............................. G06F 13/24; G06F 9/44
(52) U.S. Cl. ........................ 710/262; 710/266; 712/244
(58) Field of Search ................................. 710/260–263, 710/266, 267, 269; 719/318, 319, 328; 712/227, 244

(56) References Cited

U.S. PATENT DOCUMENTS

| | | | | |
|---|---|---|---|---|
| 5,349,667 A | * | 9/1994 | Kaneko | 710/267 |
| 5,619,704 A | * | 4/1997 | Yagi et al. | 710/262 |
| 5,636,366 A | * | 6/1997 | Robinson et al. | 711/163 |
| 5,949,985 A | | 9/1999 | Dahl et al. | |
| 6,038,631 A | * | 3/2000 | Suzuki et al. | 710/260 |
| 6,480,952 B2 | * | 11/2002 | Gorishek et al. | 712/227 |
| 6,647,485 B2 | * | 11/2003 | Nguyen et al. | 712/23 |

FOREIGN PATENT DOCUMENTS

| | | |
|---|---|---|
| JP | 11353347 A | 12/1999 |
| WO | WO92/15946 | 9/1992 |

OTHER PUBLICATIONS

U.S. Appl. No. 09/924,260 filed Aug. 8, 2001 for "Dynamic Execution Layer Interface For Explicitly Or Transparently Executing Application Or System Binaries" of Evelyn Duesterwald et al.

* cited by examiner

Primary Examiner—Khanh Dang

(57) ABSTRACT

Disclosed herein is a method and apparatus for handling an asynchronous interrupt while emulating software so that the system is in a known state when the interrupt is handled. The method includes suspending the asynchronous interrupt so that it remains pending without interrupting software execution when it arrives, then synchronizing delivery of the interrupt to an instruction by issuing an exception. The instructions which trigger exceptions are inserted in the native code at locations corresponding to original instruction boundaries.

26 Claims, 6 Drawing Sheets

SYNCHRONIZATION OF ASYNCHRONOUS EMULATED INTERRUPTS

FIELD OF THE INVENTION

This invention relates generally to emulators and more specifically to synchronizing emulated interrupts.

BACKGROUND

Computers widely available today have many different architectures, each with their own instruction set. These architectures are upgraded and modified with each new generation of microprocessors, generally providing additional processing power. Unfortunately, as computer hardware is upgraded or replaced, the preexisting software, which was created at enormous cost and effort, may be rendered obsolete. Since the software was written for a previous instruction set architecture, it generally contains instructions which the new computer hardware does not understand. The resulting need to replace software whenever computer hardware is replaced is enormously expensive, both in capital costs and training costs for users.

One solution which is becoming increasingly practical is to emulate the previous architecture on the new architecture, running the preexisting software through the emulator. As instructions are obtained from the software during execution, they are replaced or modified to run natively by the emulator on the new architecture. Unfortunately, it is difficult to correctly process interrupts while emulating software on a computer with a non-native instruction set, because the instructions from the software typically are not replaced one-to-one with native instructions. Thus, a single instruction may be replaced with a series of several new instructions. When execution of the series of new instructions is interrupted by an interrupt, the emulated architecture may not be in a known state. Interrupts are asynchronous exceptional events, such as a timer tick or a peripheral transaction notification. These events are serviced by the interrupt-catching mechanism native to the emulated instruction set or virtual machine. This interrupt-catching mechanism expects to see the virtual machine in states which occur at native instruction boundaries. However, the emulated series of replacement instructions may not leave the virtual machine in an expected state if the series of replacement instructions is interrupted at a point which does not correspond to one of the original instruction boundaries.

SUMMARY

While emulating software, asynchronous interrupts are handled by suspending the asynchronous interrupt so that it remains pending without interrupting execution of the software. Delivery of the asynchronous interrupt is synchronized to an instruction code.

BRIEF DESCRIPTION OF THE DRAWINGS

Illustrative embodiments of the invention are shown in the accompanying drawing, in which.

DESCRIPTION

Figure 1:
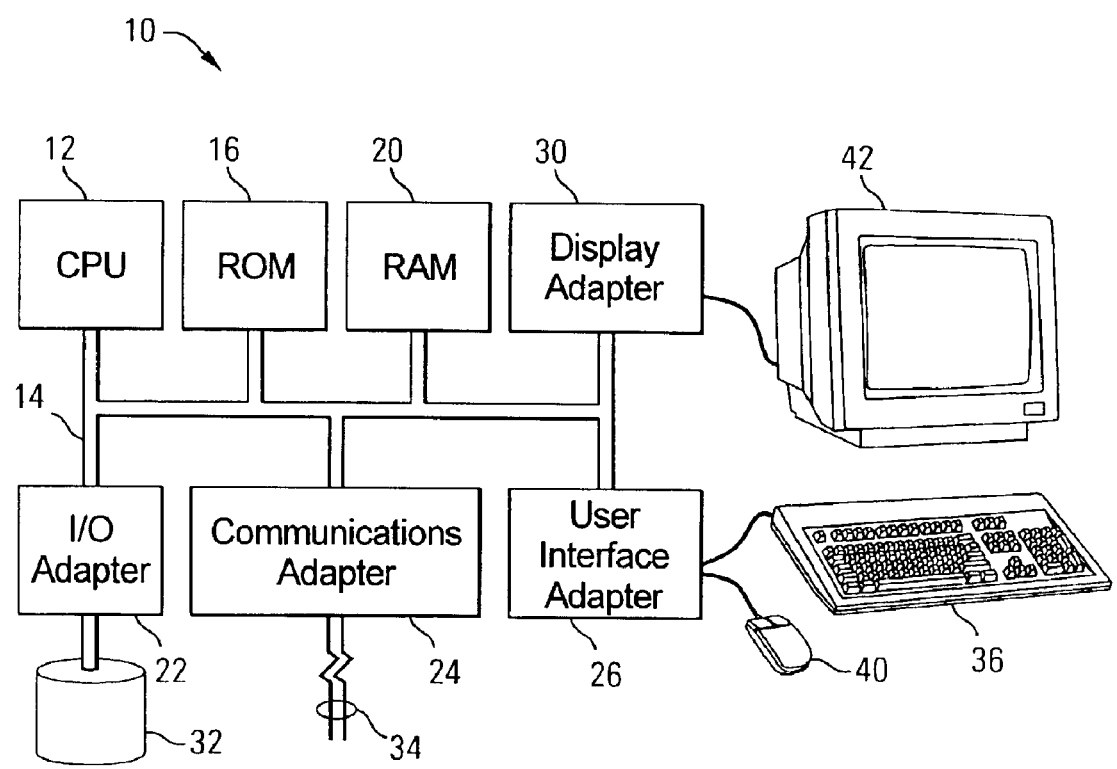
FIG. 1 is an exemplary block diagram of an embodiment of a computer system which may be used to synchronize asynchronous interrupts while emulating software.

A typical computer system which may be used to synchronize interrupts is illustrated in the block diagram of FIG. 1. The computer system 10 includes a central processing unit (CPU) 12 which includes support for synchronization of asynchronous interrupts, as will be described below. The CPU 12 is connected by a system bus 14 to devices such as a read-only memory (ROM) 16, a random access memory (RAM) 20, an input/output (I/O) adapter 22, a communications adapter 24, a user interface adapter 26, and a display adapter 30. Data storage devices such as a hard drive 32 are connected to the computer system 10 through the I/O adapter 22. In operation, the CPU 12 in the computer system 10 executes instructions stored in binary format on the ROM 16, on the hard drive 32, and in the RAM 20, causing it to manipulate data stored in the RAM 20 to perform useful functions. The computer system 10 may communicate with other electronic devices through local or wide area networks (e.g., 34) connected to the communications adapter 24. User input is obtained through input devices such as a keyboard 36 and a pointing device 40 which are connected to the computer system 10 through the user interface adapter 26. Output is displayed on a display device such as a monitor 42 connected to the display adapter 30. Synchronization of interrupts may be performed on such a computer system 10, or any other suitably configured processing system.

Synchronization of interrupts is applicable in a variety of computer processing environments, particularly during software emulation, translation, optimization, and other cases in which program code is transformed, as well as more traditional interrupt handling tasks to optimize the management of nested interrupts. When transforming program code in a computer system 10 by running it through an emulator, translating it, or optimizing it, etc, original instructions are replaced by native instructions. The code written for an original instruction set is replaced or supplemented with new instructions which are native to the target computer system or emulation host. An important part of code transformation is preserving the observability property of the original code.

Observability of the system in this case is defined as the property of the system to be in a certain known state that can be 'observed' or otherwise determined at certain synchronization points during program execution. Observability is an essential prerequisite for restoring that state of the system after the exceptional event (e.g. an interrupt) has been dealt with. This is also sometimes referred to in the literature as the system supporting 'precise exceptions.' In other words, in the case of exceptional events, the correct state of the processing environment must be delivered to the handler of the exceptional event so that the handler could for example restore the state once the handler has completed its task.

There are two main types of exceptional events to be dealt with when transforming code, exceptions and interrupts. Exceptions are synchronous exceptional events and are generated internally when an instruction is executed, such as memory management faults and floating point exceptions. Exceptions in the context of an translating emulator can be managed in many different ways, for example by generating exception-checking code corresponding to any original instructions that can generate exceptions in the emulated instruction set or virtual machine. For example, the translation of a memory operation may include some code to check for exceptions before committing changes to the emulated state.

In contrast, interrupts are asynchronous exceptional events and are generated externally, such as a timer tick or a peripheral transaction notification. Asynchronous events interrupt program execution at unexpected times. Interrupts are much harder to deal with than exceptions in the context of a translating emulator, especially if they are serviced by the same native interrupt-catching mechanism that is used for native interrupt processing (this is desirable to get better performance and interrupt response times). The native interrupt-catching mechanism normally invokes preassigned interrupt handling functions which often access registers and other state-dependent aspects of the processor. In the case of a translating emulator, some of the native interrupts may be assigned to the emulated environment and therefore need to be processed by the corresponding emulated interrupt handling functions.

It is noted that conventionally masked interrupts that are pending remain pending until they are unmasked and serviced by the interrupt service routine. Unmasking a conventionally masked interrupt at a synchronization point has several disadvantages. The first disadvantage is that unmasking interrupts is generally a privileged operation, and the translated code/virtual machine environment (or at least part of the translated code) may be running at a user level. As interrupts may and do occur at any time, the conventionally masked interrupt would not be un-maskable at the desired synchronization point if the system is running even partially in user mode rather than privileged mode.

The second disadvantage with attempting to unmask conventionally masked interrupts at a synchronization point it is that unmasking usually doesn't become active immediately. Rather, unmasking generally takes affect some cycles after the unmasking operation was issued (generally a store in a control register). Furthermore, the resulting issued interrupt will still allow completion of the instructions entering the pipeline after the instruction that unmasked the interrupts.

This is not the case if the interrupt is converted into an exception (from the pipeline perspective at least), as is done when synchronizing asynchronous emulated interrupts, because in the case of an exception all the instructions entering the pipeline after the excepting one (the generated exception in this case, referred to herein as a "trap-on-interrupt" exception) are quashed.

In order to make sure that asynchronous interrupts find the processing system in a consistent known state, very conservative strategies are generally adopted which can greatly slow emulation. Synchronization of interrupts elegantly solves the problem of dealing with asynchronous events by turning them into synchronous events at predetermined points in the program, where the processing system is guaranteed to be in a legal checkpoint or known state. It enables all the techniques dealing with just-in-time compilation and dynamic optimization, while preserving the original semantics of interrupt handling in the emulated instruction set or virtual machine.

Synchronization of interrupts as disclosed herein is beneficial in a variety of processing environments, whenever interrupt delivery point management can prevent errors or simplify interrupt handling, and is not limited to software emulation or the other exemplary processing environments described herein. Synchronization of asynchronous interrupts can also be used to manage interrupt delivery and processing in original code running natively on a processor. That being said, synchronization of interrupts will be described herein as it applies to the software emulation environment.

In one exemplary embodiment, synchronization of asynchronous interrupts is performed by an emulator running as part of a dynamic execution layer such as that described in U.S. patent application Ser. No. 09/924,260 for a "Dynamic Execution Layer Interface for Explicitly or Transparently Executing Application or System Binaries," filed Aug. 8, 2001, which is incorporated herein by reference for all that it discloses. The dynamic execution layer provides several-services for the emulator, such as control of a legacy computer program to intercept and read original instruction codes, replace them with native instructions, optimize the native instructions, store the native instructions in a cache, and control execution of the translated instructions from the cache, etc.

The dynamic execution layer described in the above-referenced patent application is a software layer that executes between a computer program and the computer hardware in order to transform the program. The dynamic execution layer intercepts instructions from the executable image of the program before they are executed by the hardware and transforms them, such as to translate them, optimize them, provide virtual support for missing hardware, or any number of desirable tasks. The dynamic execution layer may also cache transformed code segments to improve execution speed of code segments which are repeatedly executed.

Managing the delivery point of interrupts during software emulation and translation can be extremely important, particularly in the case in which the emulation system also emulates system code like an operating system (OS) and device drivers. The exemplary emulator reads a stream of instruction codes designed for an original instruction set in an original processor, and replaces them with instruction codes that are native to a second instruction set in a replacement processor, thus emulating the original instruction set on the replacement processor. Thus, the term "original instructions" refers herein to instruction code written for the original processor under the original instruction set, and the term "native instructions" refers herein to the replacement instruction code written for the replacement processor. The native instructions are a translation of the original instructions.

Figure 2:
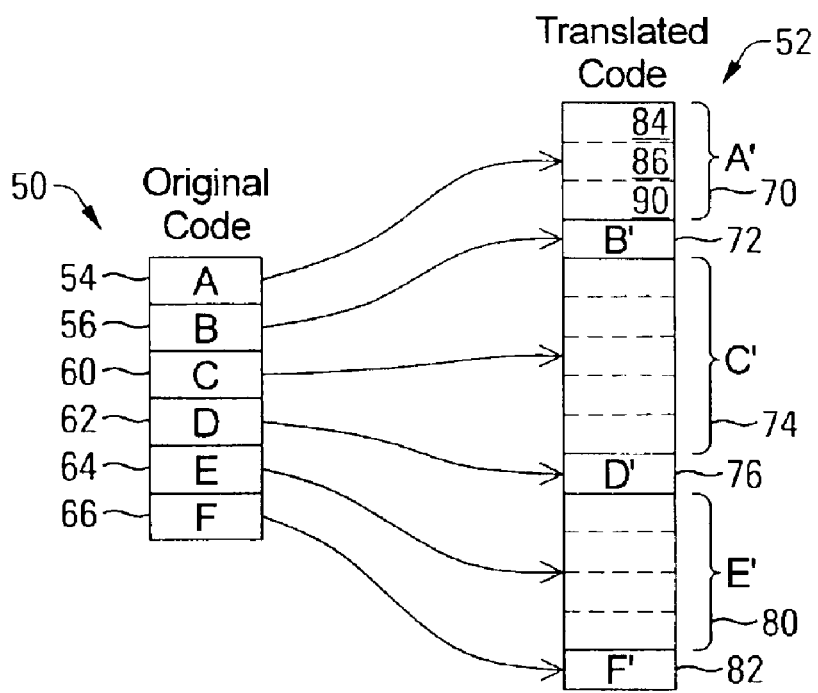
FIG. 2 is an exemplary diagram illustrating how original instructions correspond to native instructions in an embodiment of an emulation process.

Referring now to FIG. 2, the emulation process will be described. The emulator reads a series of original instructions 50 and replaces them with a series of native instructions 52. The original instructions A–F (54, 56, 60, 62, 64 and 66) are replaced with native instructions A'–F' (70, 72, 74, 76, 80 and 82) which perform the original operations natively on the replacement processor. Note that some original instructions may be replaced with a single instruction, such as B 56 with B' 72 and D 62 with D' 76. Other original instructions, however, must be replaced with several native instructions, such as A 54 being replaced with several native instructions 84, 86 and 90 making up the replacement A' 70.

Figure 3:
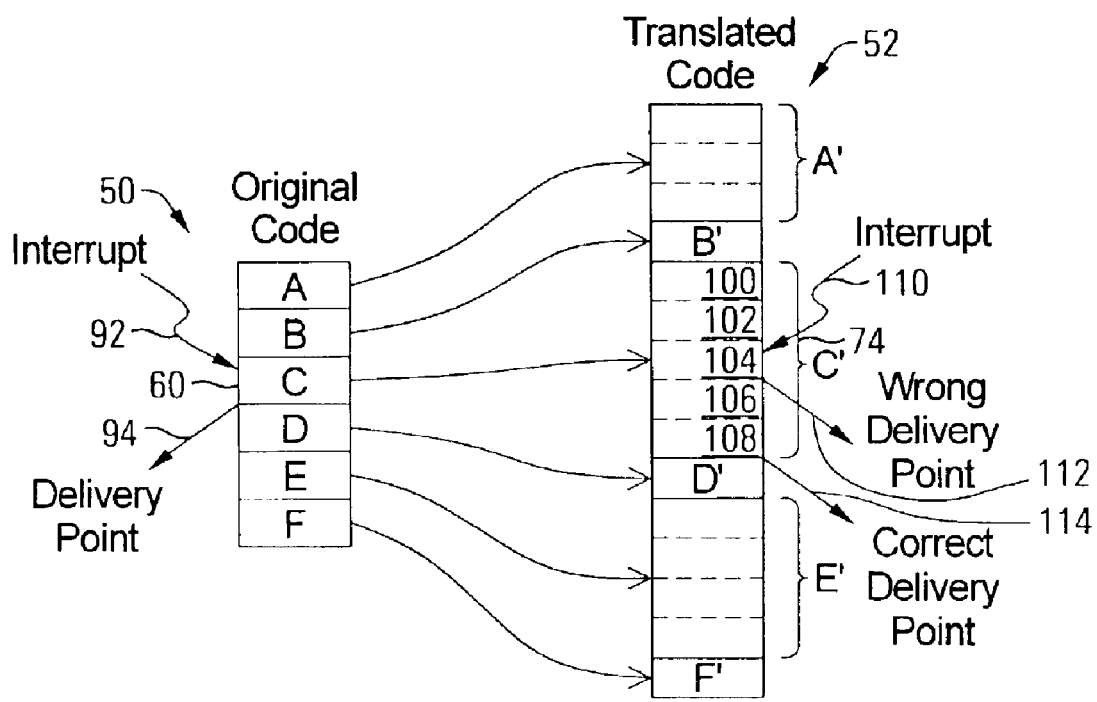
FIG. 3 is a diagram illustrating how interrupts can arrive and be executed at the wrong delivery point during execution of native instructions during emulation in an exemplary embodiment.

Thus, during emulation, as instruction codes are replaced or modified, the instruction boundaries in the new code may not correspond with the instruction boundaries in the original code. This can cause problems for interrupt handlers by leaving the emulated processor in an unknown state. Referring now to FIG. 3, if an interrupt 92 is generated during execution of instruction C 60, the interrupt catching mechanism will deliver the interrupt 92 to the native processor at the end 94 of instruction C 60. If the original instruction C 60 were replaced with a single native instruction, the interrupt could be handled without problem in the native instruction stream. The interrupt handler itself is likely to be written as an emulated program, and it often queries the state of the interrupted (emulated) program as part of its normal operation. Strictly speaking, passing a corrupted state to the interrupt handler would be a violation of the execution model of the emulated environment.

An emulated interrupt handler can be invoked in a variety of ways by the native interrupt handling system. For example, many native interrupt handling systems have the capability of remapping interrupt handling functions with programmable interrupt vectors. In that case, the virtual machine may assign the emulated interrupt handler to native interrupt vectors so that the translated code in the emulated interrupt handler is invoked directly when the native interrupt system receives an interrupt. (The translated code for the handler could also contain a piece of code at the beginning with the task of altering the emulated machine state according to the interrupt semantic. For example, saving certain values in certain control registers, or loading certain other values into certain emulated machine registers.) Alternatively, native interrupt handlers may be provided to process interrupts or pass them to the emulated environment. In either of these cases, the interrupt may query the state of the emulated program expecting a known state.

In the example of FIG. 3, the original instruction C 60 is replaced with a series of five native instructions 100, 102, 104, 106 and 108 forming a replacement operation C' 74. For example, the original instruction C 60 may be a single instruction adding two numbers, which must be replaced by a series of five instructions 100, 102, 104, 106 and 108 during emulation to handle hardware differences such as instruction semantics, bus width, byte endian order, register organization, etc. In this example, the interrupt handler expects to be handed the processor in a given state, such as the registers containing correct values produced by the emulated instructions executed before the interruption occurred, the emulated program counter at the time of the interruption, etc. However, if the replacement series of five instructions 100, 102, 104, 106 and 180 forming C' 74 is interrupted during the third replacement instruction 104, the native interrupt catching mechanism will deliver the interrupt 110 at the end 112 of the third replacement instruction 104. The emulated processor will likely be left in an unknown state, such as with temporary values stored in emulated registers rather than the expected values. The unknown processor state can cause fatal errors and other problems like program execution resumption at the wrong program counters, etc. The correct interrupt delivery point, at which the emulated system is in a known state, is at the end 114 of the last native instruction forming the replacement series C' 74, which corresponds to the end 94 of the original instruction C 60. Thus, delaying asynchronous interrupts at least until points in the native code corresponding to original instruction boundaries ensures that emulated interrupt handlers will find the native processing system in an expected state.

Synchronization of interrupts provides a system to delay interrupt handling until desired code locations when the processor is in a known state. Functionality is added to the native interrupt controller to selectively suspend certain interrupts when caught, extending the normal native interrupt control mechanism. The extension involves adding a special control register (the "suspend mask" register) which is logically and-ed with the interrupt mask register to generate both a normal interrupt signal and an interrupt signal to the processor core to be synchronized (referred to herein as an exception triggering signal), as will be described in more detail below. A suspend instruction is added to the native code which stores a value in the suspend mask register to suspend asynchronous interrupts until the proper delivery point.

The exception triggering signal triggers the generation of an exception when an instruction is reached in the code that permits delivery of an asynchronous interrupt as a synchronous exception. Several exemplary embodiments of the interrupt-permit instruction are described below. The first exemplary embodiment includes adding a user-level (non-privileged) instruction, "trap-on-interrupt" (TOI) to the instruction set. (Note that the TOI instruction may alternatively be given any name desired.) The TOI instruction checks the list of pending interrupts. If pending interrupts of a given type exist (all maskable interrupts in this case), it delivers a special trap, otherwise it behaves like a no-operation (no-op). When the TOI instruction reaches the commit stage, an exception is generated synchronized to the TOI instruction itself.

The second exemplary embodiment includes adding a trap-on-interrupt control register. In this embodiment, the interrupt-permit instruction is an instruction which accesses the trap-on-interrupt control register (TOI_CR). When the instruction accesses the TOI_CR while a suspended interrupt is waiting, the TOI_CR generates an exception such as a memory exception, as if it were accessing illegal memory, causing a segmentation violation (SIGSEGV).

When the exception interrupts execution, the exception handler invokes the proper interrupt handler in a system-dependent manner. For example, as discussed above, the exception handler may read the exception triggering signal which carries the interrupt vector for the suspended interrupt, and invoke the interrupt handler corresponding to that interrupt vector.

Although all interrupts may potentially be suspended to synchronize them, the exemplary embodiment discussed herein synchronizes only maskable interrupts.

Suspended interrupts are thus synchronized by generating an exception synchronized to an interrupt permit instruction. Because the suspended interrupt is in effect converted to an exception, all instructions in a state prior to the commit stage will be quashed rather than draining the pipeline (executing the instructions in the pipeline).

Figure 4:
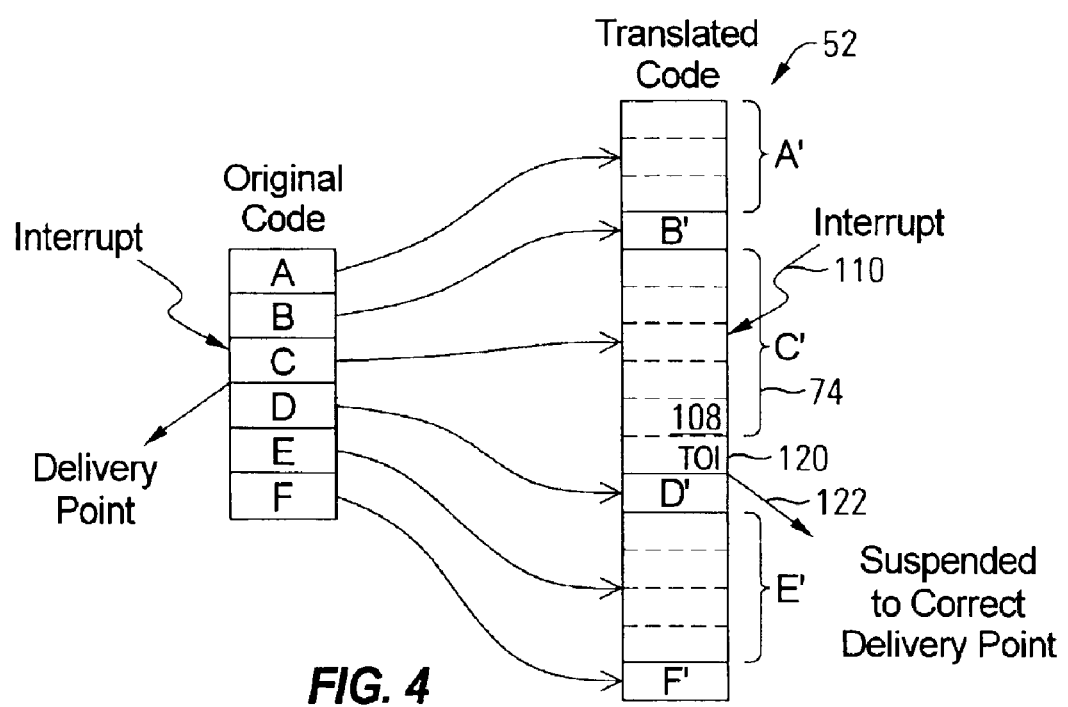
FIG. 4 is a diagram illustrating suspension of interrupts until the correct delivery point in native instructions during an emulation process in an exemplary embodiment.

Referring now to FIG. 4, the use of the suspend mask register and the interrupt-permit instruction to synchronize an asynchronous interrupt will be described. First, interrupts are suspended before entering the native code 52. This may be done by computing and setting the value for the suspend mask according to which interrupts in the native system ought to be mapped onto the emulated code, for example by a store into the corresponding suspend mask control register. This would be done for example by the virtual machine run-time environment at initialization time while running in privileged mode. This is a privileged operation, but is typically only performed once before entering native code 52.

Then, at every point in the native code 52 where interrupts are to be deliverable, an interrupt-permit instruction is added (either a TOI instruction or an instruction accessing a TOI_CR). The interrupt-permit instruction is added to the native code 52 at each point at which interrupts may be safely handled, allowing pending interrupts to interrupt program execution at only these points. For example, to prevent an asynchronous interrupt from being delivered during execution of native operation C' 74, an interrupt-permit instruction 120 is added to the native instruction sequence 52 after the last instruction 108 in C' 74. Delivery of the interrupt 110 is thus suspended until the correct delivery point 122 at the interrupt-permit instruction 120, effectively synchronizing the asynchronous interrupt 110.

The interrupt-permit instructions to synchronize interrupts thus greatly simplify interrupt handler programming by ensuring that they will see the processor in a known state. Synchronizing asynchronous interrupts during software emulation also facilitates optimization and monitoring of emulated code. The interrupt-permit instructions to synchronize interrupts may be added by a translating emulator or other system at every point in the replacement code corresponding to an original instruction boundary, or automatically according to any other desired algorithm, etc.

Figure 5:
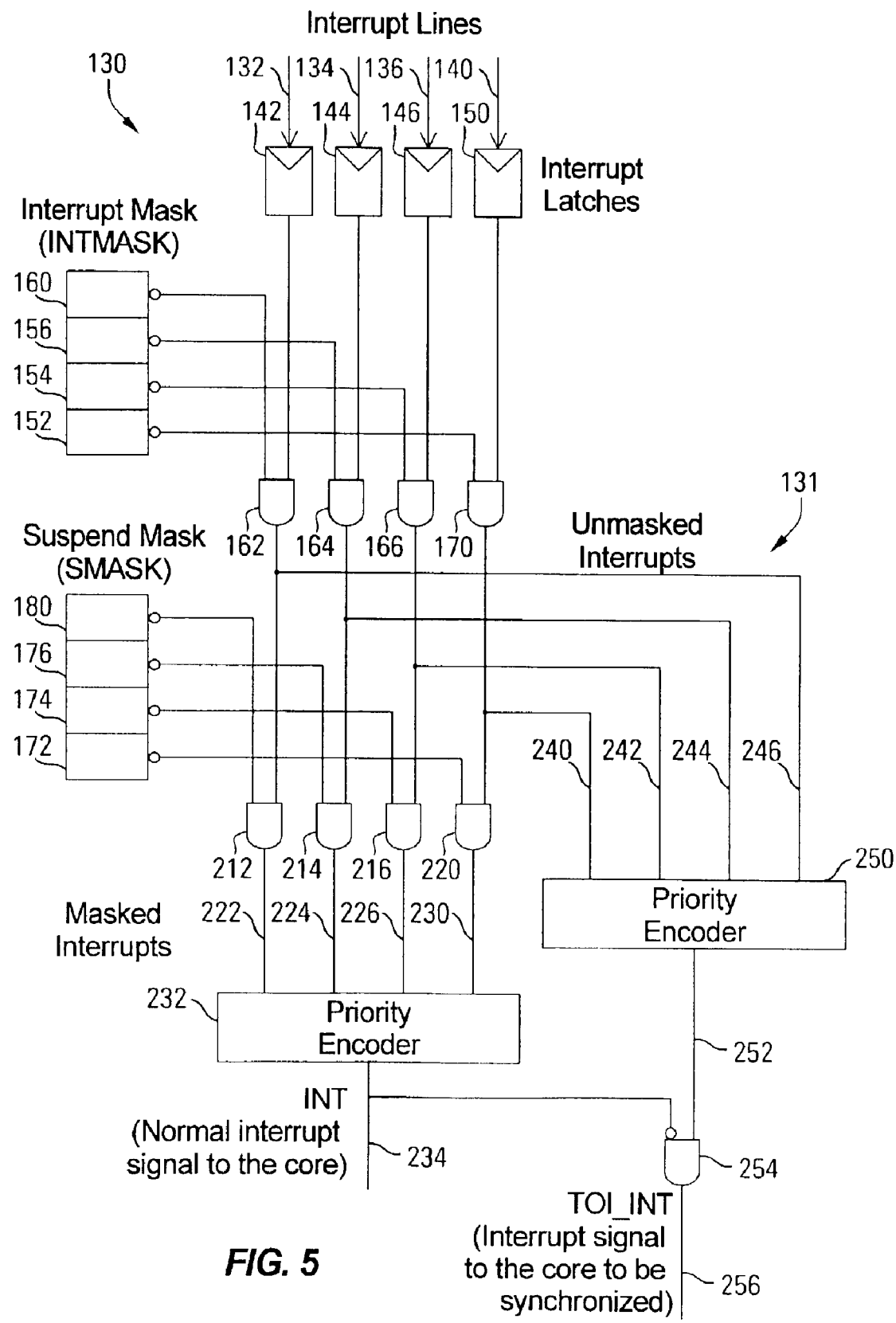
FIG. 5 is a circuit diagram illustrating an exemplary embodiment of a interrupt processing circuit for suspending interrupts during emulation.

Referring now to FIG. 5, an exemplary implementation of an interrupt controller 130 having a subcircuit 131 for suspending interrupts will be described. It is important to note, however, that the system for synchronizing asynchronous interrupts is not limited to the exemplary circuit illustrated in FIG. 5, but may be implemented in any other suitable circuit, firmware or software as desired. The exemplary interrupt controller 130 illustrated in FIG. 5 is simplified to include only four interrupt lines, although it can be extended as desired. The exemplary interrupt controller 130 illustrated in FIG. 5 also permits delivery of any type of suspended interrupt, although it can easily be adapted to selectively permit delivery of a single type of interrupt.

Interrupt signals arrive on the four interrupt lines 132, 134, 136 and 140. The interrupt signals are latched in four interrupt latches 142, 144, 146 and 150 that are connected to the four interrupt lines 132, 134, 136 and 140, respectively. Interrupts may be masked to determine which interrupt signals will be delivered to the processor core using interrupt masks (INTMASKs) 152, 154, 156 and 160 which are and-ed with the latched interrupt signals in four AND gates 162, 164, 166 and 170. That is, the outputs of an interrupt latch (e.g., 150) and a corresponding interrupt mask (e.g., 160) are connected to the inputs of an AND gate 170. These interrupt signals are referred to herein as "unmasked interrupts," indicating that they have not been masked by a suspend mask.

The resulting latched unmasked interrupt signals may be suspended by suspend masks (SMASKs) 172, 174, 176 and 180. The suspend mask signals at the outputs of the suspend masks 172, 174, 176 and 180 are combined with the unmasked interrupt signals from the four AND gates 162, 164, 166 and 170 in four additional AND gates 212, 214, 216 and 220, forming four masked interrupts 222, 224, 226 and 230. These masked interrupts 222, 224, 226 and 230 may be fed into a priority encoder 232, then delivered to the processor core as a normal interrupt signal 234 in which interrupts may be suspended.

The latched unmasked interrupt signals 240, 242, 244, and 246 at the outputs of the four AND gates 162, 164, 166 and 170 may also be fed into another priority encoder 250 which produces a non-suspended normal interrupt signal 252. The normal interrupt signal 234 from the first priority encoder 232 is connected to the inverting input of an AND gate 254, and the non-suspended normal interrupt signal 252 is connected to the non-inverting input of the AND gate 254 to produce a trap-on-interrupt (TOI) interrupt signal TOI_INT 256, an interrupt signal provided to the processor core to be synchronized.

During operation, values are written to the INTMASK and SMASK registers 152, 154, 156 and 160 and 172, 174, 176 and 180 with a privileged mode operation. The INTMASK 152, 154, 156 and 160 are written as part of the normal operation of the system. The SMASK registers 172, 174, 176 and 180 are written by the emulator supervisor before entering translated code. As an interrupt signal (e.g., 140) is generated, it is stored in the corresponding interrupt latch (e.g., 150). If the corresponding INTMASK register 152 has a non-zero value, it masks out the output of the interrupt latch 150 in AND gate 170. (Note that in this exemplary embodiment, the output of the mask registers 152, 154, 156 and 160 and 172, 174, 176 and 180 are inverted.) If the corresponding INTMASK register 152 has a zero value, it produces a true value which is combined with the true value from the interrupt latch 150 in the AND gate 170 to generate the unmasked interrupt signal 240 at the output of the AND gate 170.

A masked interrupt 230 is formed by combining the unmasked interrupt signal 240 with the suspend mask signal from the suspend mask register 172 in AND gate 220. Thus, when the interrupt latch 150 contains an interrupt and the corresponding INTMASK 152 and SMASK 172 registers contain zero values, the masked interrupt 230 is generated. When the SMASK register 172 contains a non-zero value, the masked interrupt 230 is suspended and the INT normal interrupt signal 234 remains unasserted. Interrupts which are suspended are kept pending in the interrupt latch 150 until an interrupt-permit instruction is reached or the SMASK register 172 is cleared.

The masked interrupt 230 and other interrupts 222, 224, and 226 may be prioritized in the priority encoder 232 to generate the INT normal interrupt signal 234 for the processor core.

When the interrupt latch 150 contains an interrupt and the corresponding INTMASK 152 and SMASK 172 registers contain zero and non-zero values respectively, the masked interrupt 230 is suspended, but the unmasked interrupt 240 is asserted.

Unmasked interrupts 240, 242, 244 and 246 may be prioritized in the second priority encoder 250 to generate the non-suspended normal interrupt signal 252.

The suspended (unasserted) INT normal interrupt signal 234 is inverted and combined with the non-suspended (asserted) normal interrupt signal 252 in the AND gate 254 to generate an asserted TOI_INT interrupt signal 256 to be sent to the core for synchronization.

In summary, when an interrupt 140 is present but not suspended, the INT normal interrupt signal 234 will be asserted and the TOI_INT interrupt signal 256 will not be asserted. The normal interrupt handling process is invoked by the INT normal interrupt signal 234. When the interrupt 150 is present and suspended, the INT normal interrupt signal 234 will not be asserted and the TOI_INT interrupt signal 256 will be asserted. The normal interrupt handling process is not invoked so that the code is not inadvertently interrupted in an illegal location. The TOI_INT interrupt signal 256 will trigger generation of an exception, a synchronous exceptional event, when an interrupt-permit instruction in the code is subsequently executed.

Figure 6:
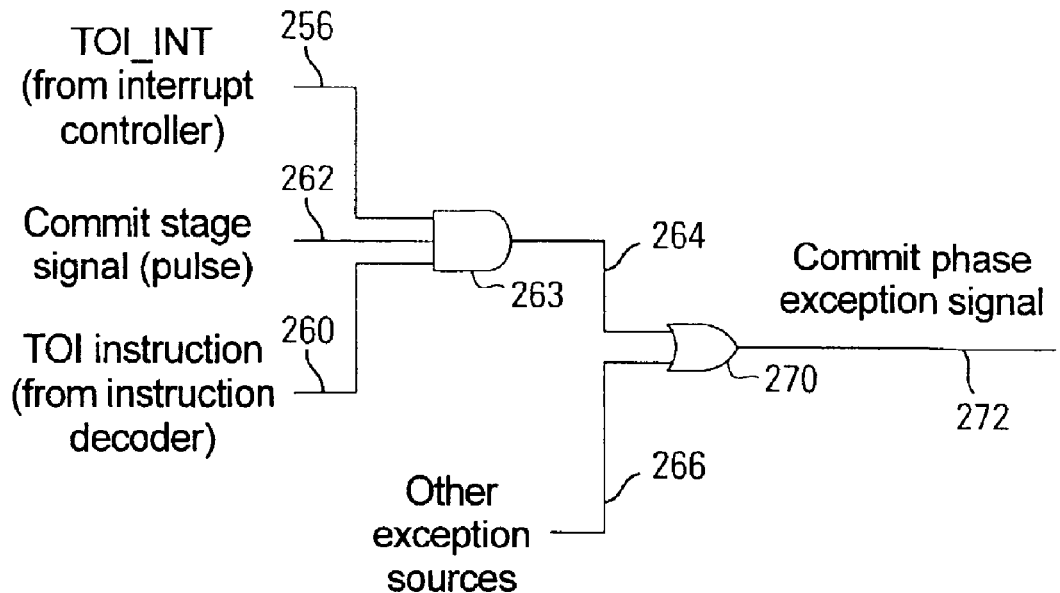
FIG. 6 is a circuit diagram of a first exemplary embodiment of an exception generator to generate an exception when an asynchronous suspended interrupt is to be processed.

In a first exemplary embodiment, the interrupt-permit instruction is a trap-on-interrupt (TOI) instruction added to the instruction set of the target processor. Referring now to FIG. 6, an exception is generated during the commit phase of instruction execution when the TOI_INT interrupt signal 256 is asserted and the TOI instruction is executed. An AND gate 263 is used to combine the TOI_INT interrupt signal 256, a signal 260 from the instruction decoder in the processor that indicates when the TOI instruction is being executed, and a signal 262 that is pulsed during the commit phase of instruction execution. The resulting signal 264 and other exception sources 266 enter an OR gate 270 to produce a commit phase exception signal 272. The commit phase exception signal 272 may be used in the processor core as other existing exception signals to halt execution and quash execution of other instructions in the pipeline.

The interrupt can be decoded and handled in any desired manner. For example, in one embodiment using a software-managed interrupt system the INT 234 and TOI_INT 256 signals are single wires and a single interrupt handler is invoked which may identify the interrupt by reading a control register or performing some similar operation. In another embodiment using hardware vectorization of interrupts, the interrupt controller 130 may include several interrupt vector signals, one for each possible interrupt, and different interrupt handlers could therefore be invoked directly by each interrupt vector. Regardless of how the interrupts are decoded and handled, they may be synchronized as described herein.

Figure 7:
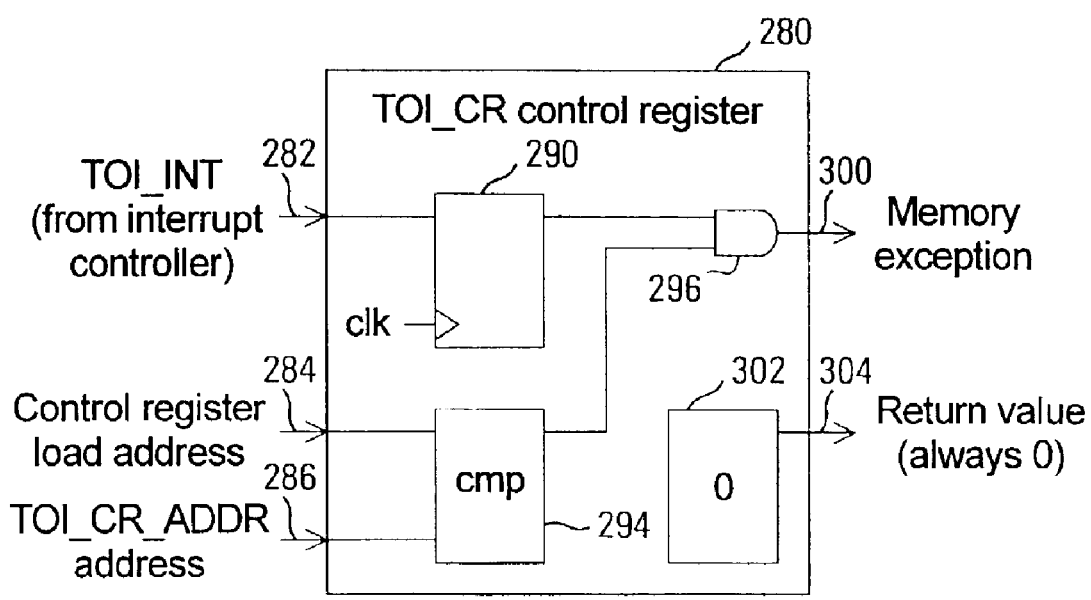
FIG. 7 is a circuit diagram of a second exemplary embodiment of an exception generator to generate an exception when an asynchronous suspended interrupt is to be processed.

Referring now to FIG. 7, the interrupt-permit instruction in a second exemplary embodiment is an existing instruction in the instruction set, such as a load instruction, which is used to access a trap-on-interrupt control register (TOI_CR) 280 in the processor. The TOI_CR 280 is a read-only control register that latches TOI_INT interrupt signal 256 and maps its value to the core memory space in an uncached area.

The TOI_CR 280 has an exception triggering input 282 connected to the TOI_INT interrupt signal 256, an address input 284 identifying the control register being accessed, and an address input 286 with the address of the TOI_CR 280. (Alternatively, the address of the TOI_CR 280 may be hard-coded in the TOI_CR 280). The exception triggering input 282 may be latched in a latch 290. An address comparator 294 compares the control register address with the TOI_CR address to indicate when the TOI_CR 280 is being accessed. The synchronous exception triggering input 282 is combined with the output of the address comparator 294 in an AND gate 296 and the output is connected to a memory exception output 300 in the TOI_CR 280. The memory exception output 300 indicates a memory exception when the TOI_INT interrupt signal 256 is asserted and the TOI_CR 280 is accessed. The TOI_CR 280 always provides a constant value 302 on its return value output 304. As discussed above, the memory exception output 300 may be used to halt execution, quash the pipeline, and invoke an appropriate interrupt handler.

The TOI_CR 280 is a constant read-only memory location mapped to the TOI_CR_ADDR memory address that always returns zero, but which generates a memory exception when the TOI_INT interrupt signal 256 is asserted. To access the TOI_CR 280 from the core, an existing load instruction can be executed as follows:

ldw $r0=TOI_CR_ADDR[$r0]

In the load instruction above, $r0 is the constant register 0, and TOI_CR_ADDR is the constant that represents the address of the TOI_CR 280. If the TOI_INT interrupt signal 256 is asserted when the TOI_CR 280 is accessed, the load generates a memory exception such as a segmentation violation (SIGSEGV), as if it were accessing illegal memory.

Selecting the most advantageous of the two exemplary exception generation embodiments depends on the processor microarchitecture. Adding the TOI instruction to the instruction set adds some complexity, but has the benefit of acting as a no-op when no interrupts are pending. This allows the TOI instruction to be inserted liberally throughout the native code with little penalty. Using an existing instruction to access a trap-on-interrupt control register avoids adding a new instruction to the instruction set, but accesses the trap-on-interrupt control register at each interrupt delivery point. This may be more or less efficient that adding the TOI instruction depending on the processor microarchitecture. The two exemplary embodiments are functionally equivalent, and other functionally equivalent embodiments may be used to generate an exception from the TOI_INT interrupt signal 256 when an interrupt-permit instruction is executed.

The interrupt controller 130 is a very simple and natural extension of the interrupt and exception control mechanisms of all modern microprocessors, thus does not add a great deal of complex circuitry to synchronize asynchronous interrupts. The interrupt-permit instruction (e.g., the TOI instruction or load instruction) is a user-level (non-privileged) excepting instruction. The TOI instruction that can be freely mixed in the native instruction stream because it behaves like a no-op when no interrupt is pending. No penalty is therefore incurred by adding TOI instructions to the native instruction stream during the most frequently executed case, when no interrupt is pending.

Interrupt-permit instructions may be inserted at each emulated instruction boundary, but may be inserted more infrequently if desired. The granularity of interrupt-permit instruction inclusion depends on the real-time characteristics of the program, and the latency that is acceptable for delivery of interrupts. Too many interrupt-permit instructions may inhibit code optimization but would guarantee timely servicing of interrupts. Optimization may be inhibited because an emulator such as that described above may not be able to relocate native instructions across an interrupt-permit instruction. Too few interrupt-permit instructions enables free code motion during optimization, but reduces the observable points of the program. For example, at least one interrupt-permit instruction should certainly be included in each loop. Thus, as mentioned above, the interrupt-permit instruction may be automatically added to the native instruction stream at each original instruction boundary, or may be added according to some algorithm for balancing needs such as timely interrupt delivery versus optimizability.

Figure 8:
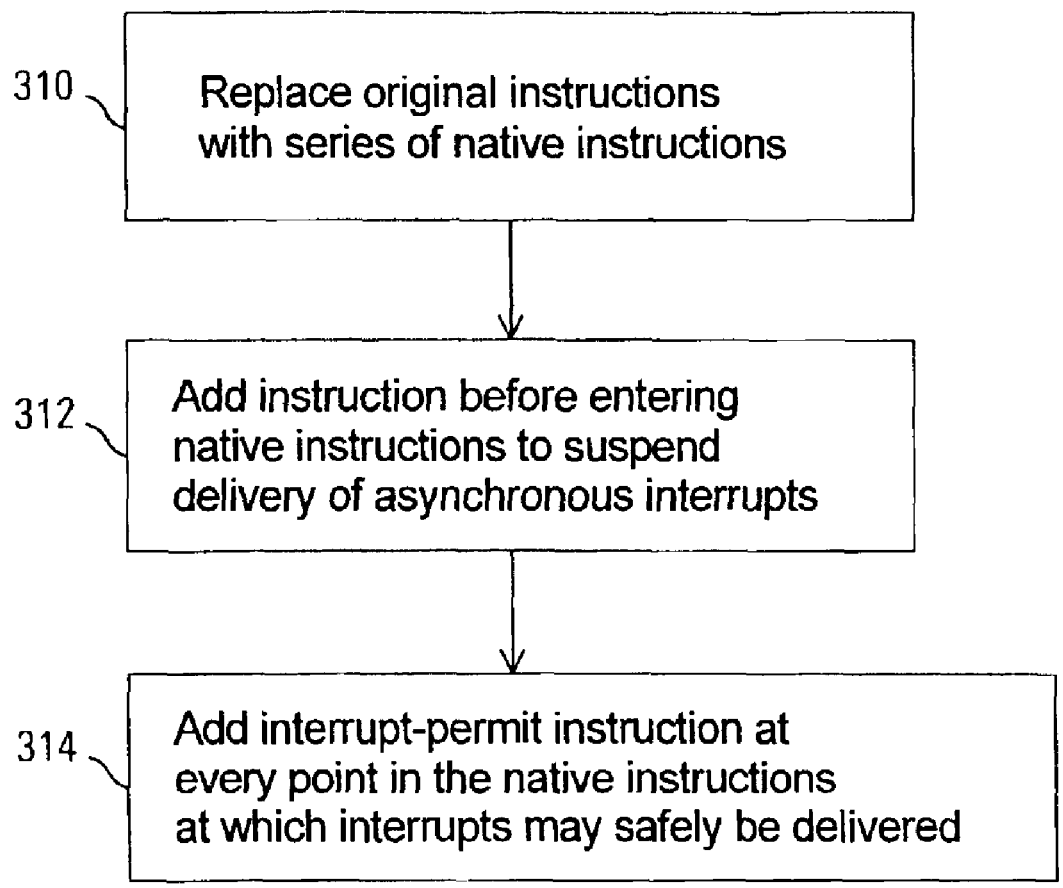
FIG. 8 is a flow chart of an exemplary embodiment of an operation for synchronizing asynchronous interrupts during emulation.

A flow chart summarizing synchronization of asynchronous emulated interrupts is illustrated in FIG. 8. Original instructions are replaced 310 by series of native instructions. An instruction is added 312 before entering the native instructions to suspend delivery of asynchronous interrupts. An interrupt-permit instruction is added 314 at every point in the native instructions at which interrupts may safely be delivered, such as at points corresponding to original instruction boundaries.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of handling an asynchronous interrupt while emulating software, the method comprising:
suspending said asynchronous interrupt so that it remains pending without interrupting execution of said software when said asynchronous interrupt arrives; and
synchronizing delivery of said asynchronous interrupt to an instruction code wherein said synchronizing delivery of said asynchronous interrupt to said instruction code comprises generating an exception when a trap-on-interrupt instruction is reached.

2. The method of claim 1, wherein delivery of said asynchronous interrupt is synchronized to said instruction code by generating an exception when said instruction code is executed.

3. A method of handling an asynchronous interrupt while emulating software, the method comprising:
suspending said asynchronous interrupt so that it remains pending without interrupting execution of said software when said asynchronous interrupt arrives; and
synchronizing delivery of said asynchronous interrupt to an instruction code, wherein said synchronizing delivery of said asynchronous interrupt to said instruction code comprises generating an exception when a trap-on-interrupt control register is accessed and said asynchronous interrupt is pending.

4. A method of handling an asynchronous interrupt while emulating software, the method comprising:
suspending said asynchronous interrupt so that it remains pending without interrupting execution of said software when said asynchronous interrupt arrives; and
synchronizing delivery of said asynchronous interrupt to an instruction code; and
replacing original instructions in said software with native instructions, wherein at least one of said original instructions is replaced with a plurality of native instructions.

5. The method of claim 4, further comprising adding a suspend instruction before a first of said native instructions to suspend asynchronous interrupts while said native instructions are executing until an instruction is reached permitting delivery of said asynchronous interrupts.

6. The method of claim 5, further comprising delivering said asynchronous interrupts by generating an exception when said instruction is reached permitting delivery of said asynchronous interrupts.

7. The method of claim 4, further comprising adding at least one instruction permitting delivery of said asynchronous interrupts to said native instructions.

8. The method of claim 7, wherein said at least one instruction permitting delivery of said asynchronous interrupts is added to said native instructions at a location corresponding to an instruction boundary in said original instructions.

9. The method of claim 8, wherein said at least one instruction permitting delivery of said asynchronous interrupts comprises a trap-on-interrupt instruction.

10. The method of claim 7, wherein said at least one instruction permitting delivery of said asynchronous interrupts comprises an instruction accessing a trap-on-interrupt control register.

11. The method of claim 7, wherein said at least one instruction permitting delivery of said asynchronous interrupts delivers said asynchronous interrupts by generating an exception to indicate a presence of said asynchronous interrupt, said exception being synchronized to said instruction.

12. An interrupt handling apparatus, comprising:
an interrupt latch having an input and an output, an interrupt signal being connected to said input;
a suspend mask register;
a first AND gate having at least two inputs and an output, said output generating a normal interrupt signal, a first of said two inputs being connected to said interrupt latch output, said suspend mask register being connected to a second of said two inputs; and
a second AND gate having at least an inverting input and a non-inverting input and an output, said output generating an exception triggering signal, said non-inverting input being connected to said interrupt latch output, and said inverting input being connected to said first AND gate output.

13. The apparatus of claim 12, wherein said suspend mask register suspends interrupts until they can trigger an exception synchronized to an interrupt-permit instruction.

14. The apparatus of claim 12, further comprising a first priority encoder having at least one input and an output connected between said first AND gate output and said second AND gate inverting input, said input being connected to said first AND gate output, said output being connected to said second AND gate inverting input, said normal interrupt signal appearing on said first priority encoder output.

15. The apparatus of claim 12, further comprising a second priority encoder having at least one input and an output connected between said interrupt latch and said second AND gate, said input being connected to said interrupt latch output, said output being connected to said second AND gate non-inverting input.

16. The apparatus of claim 12, further comprising a third AND gate connected between said interrupt latch and said first and second AND gates, said third AND gate having at least two inputs and an output, an interrupt mask register being connected to a first of said at least two inputs, said interrupt latch output being connected to a second of said at least two inputs, and said output being connected to said first of said two first AND gate inputs, said output also being connected to said second AND gate non-inverting input.

17. The apparatus of claim 12, further comprising a fourth AND gate having at least two inputs and an output, a first of said at least two inputs being connected to said second AND gate output, a second of said at least two inputs being connected to an instruction decoder output indicating that a trap-on-interrupt instruction is being executed, and said output generating an exception signal.

18. The apparatus of claim 17, said fourth AND gate further having a third of said at least two inputs connected to a commit stage signal.

19. The apparatus of claim 18, wherein said commit phase signal carries a pulse during a commit stage of execution of instructions.

20. The apparatus of claim 17, further comprising an OR gate having at least two inputs and an output, a first of said two inputs being connected to said fourth AND gate output, at least a second of said at least two inputs being connected to other exception sources, said output carrying said exception signal.

21. The apparatus of claim 12, further comprising a trap-on-interrupt control register having an address input, an exception triggering input connected to said second AND gate output, a memory exception output and a return value output, wherein said memory exception output generates an exception when said trap-on-interrupt control register is accessed and wherein said return value output returns a constant value.

22. The apparatus of claim 21, said trap-on-interrupt control register comprising:

an address comparator connected to said address input to indicate when said trap-on-interrupt control register is accessed; and an AND gate having at least two inputs and an output, a first of said at least two inputs being connected to said exception triggering input, a second of said at least two inputs being connected to said address comparator, and said output being connected to said memory exception output.

23. A processor for executing emulated software, said processor comprising:

an interrupt handling circuit having an interrupt suspend subcircuit;

a trap-on-interrupt opcode for controlling said interrupt suspend subcircuit; and an exception generator for generating connected to said interrupt suspend subcircuit for generating an exception when an interrupt is suspended by said interrupt suspend subcircuit and when an instruction is executed permitting processing of suspended interrupts.

24. The processor of claim 23, said interrupt suspend subcircuit comprising a suspend mask register for causing said interrupt suspend subcircuit to suspend processing of interrupts.

25. The processor of claim 23, wherein said exception generator generates an exception when said interrupt suspend subcircuit has suspended at least one interrupt and said trap-on-interrupt instruction is executed.

26. A processor for executing emulated software, said processor comprising:

an interrupt handling circuit having an interrupt suspend subcircuit;

an exception generator connected to said interrupt suspend subcircuit for generating an exception when an interrupt is suspended by said interrupt suspend subcircuit pad when an instruction is executed permitting processing of suspended interrupts, wherein said exception generator comprises a trap-on-interrupt control register that generates an exception when said interrupt suspend subcircuit has suspended at least one interrupt and said trap-on-interrupt control register is accessed.

* * * * *

UNITED STATES PATENT AND TRADEMARK OFFICE
CERTIFICATE OF CORRECTION

| | | |
|---|---|---|
| PATENT NO. | : 6,895,460 B2 | Page 1 of 1 |
| APPLICATION NO. | : 10/198839 | |
| DATED | : May 17, 2005 | |
| INVENTOR(S) | : Giuseppe Desoli et al. | |

It is certified that error appears in the above-identified patent and that said Letters Patent is hereby corrected as shown below:

Claim 23, Column 14, line 1, after "generator" delete "for generating"

Claim 26, Column 14, line 21, delete "pad" and insert therefor --and--

Signed and Sealed this

Sixth Day of January, 2009

JON W. DUDAS
*Director of the United States Patent and Trademark Office*